United States Patent
Christensen et al.

(10) Patent No.: US 9,123,974 B2
(45) Date of Patent: Sep. 1, 2015

(54) LI-ION BATTERY WITH LOAD LEVELER

(71) Applicant: Robert Bosch GmbH, Stuttgart (DE)

(72) Inventors: John F. Christensen, Mountain View, CA (US); Boris Kozinsky, Waban, MA (US); Jasim Ahmed, Mountain View, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 13/728,082

(22) Filed: Dec. 27, 2012

(65) Prior Publication Data

US 2013/0130129 A1 May 23, 2013

Related U.S. Application Data

(63) Continuation-in-part of application No. 12/437,745, filed on May 8, 2009, now abandoned.

(51) Int. Cl.
| | |
|---|---|
| *H01M 10/05* | (2010.01) |
| *H01M 10/0567* | (2010.01) |
| *H01M 4/131* | (2010.01) |
| *H01M 10/0564* | (2010.01) |
| *H01M 4/38* | (2006.01) |
| *H01M 4/485* | (2010.01) |
| *H01M 4/58* | (2010.01) |
| *H01M 10/052* | (2010.01) |

(52) U.S. Cl.
CPC .......... *H01M 10/0567* (2013.01); *H01M 4/131* (2013.01); *H01M 4/38* (2013.01); *H01M 4/485* (2013.01); *H01M 4/5815* (2013.01); *H01M 10/052* (2013.01); *H01M 10/0564* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,046,575 A | 4/2000 | Demuro | |
| 6,773,616 B1 | 8/2004 | Chen et al. | |
| 7,029,796 B2 | 4/2006 | Choi et al. | |
| 8,163,426 B2 | 4/2012 | Hwang et al. | |
| 2004/0214091 A1 | 10/2004 | Lim et al. | |
| 2004/0242804 A1 | 12/2004 | Medsker et al. | |
| 2004/0248014 A1* | 12/2004 | West et al. | 429/313 |
| 2006/0154141 A1 | 7/2006 | Salot et al. | |
| 2006/0204855 A1* | 9/2006 | Saruwatari et al. | 429/324 |
| 2006/0216603 A1 | 9/2006 | Choi | |
| 2007/0042267 A1 | 2/2007 | Kim et al. | |
| 2007/0202400 A1 | 8/2007 | Yoshida et al. | |
| 2008/0044732 A1 | 2/2008 | Salot et al. | |

(Continued)

OTHER PUBLICATIONS

Roha, D. and U. Landau, Mass Transport of Leveling Agents in Plating: Steady-State Model for Blocking Additives. Journal of the Electrochemical Society, 1990. 137: p. 824.

(Continued)

*Primary Examiner* — Ula C Ruddock
*Assistant Examiner* — Scott J Chmielecki
(74) *Attorney, Agent, or Firm* — Maginot Moore & Beck LLP

(57) ABSTRACT

An electrochemical cell in one embodiment includes a negative electrode including a form of lithium, a positive electrode spaced apart from the negative electrode, a separator positioned between the negative electrode and the positive electrode, and an electrolyte including a load leveling agent in contact with the negative electrode.

20 Claims, 1 Drawing Sheet

(56) References Cited

U.S. PATENT DOCUMENTS

2008/0058194 A1    3/2008    Grader et al.
2009/0191465 A1*    7/2009    Hwang et al. ................ 429/331

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.

Christensen, J. and J. Newman, Cyclable Lithium and Capacity Loss in Li-Ion Cells. Journal of the Electrochemical Society, 2005. 152(4): p. A818-A829.

Amatucci, G.G. and N. Pereira, Flouride based electrode materials for advanced energy storage devices. Journal of Flourine Chemistry, 2007. 128(4):p. 243-262.

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, The Lithium/Sulfur Rechargeable Cell. Journal of the Electrochemical Society, 2002. 149: p. A1321.

* cited by examiner

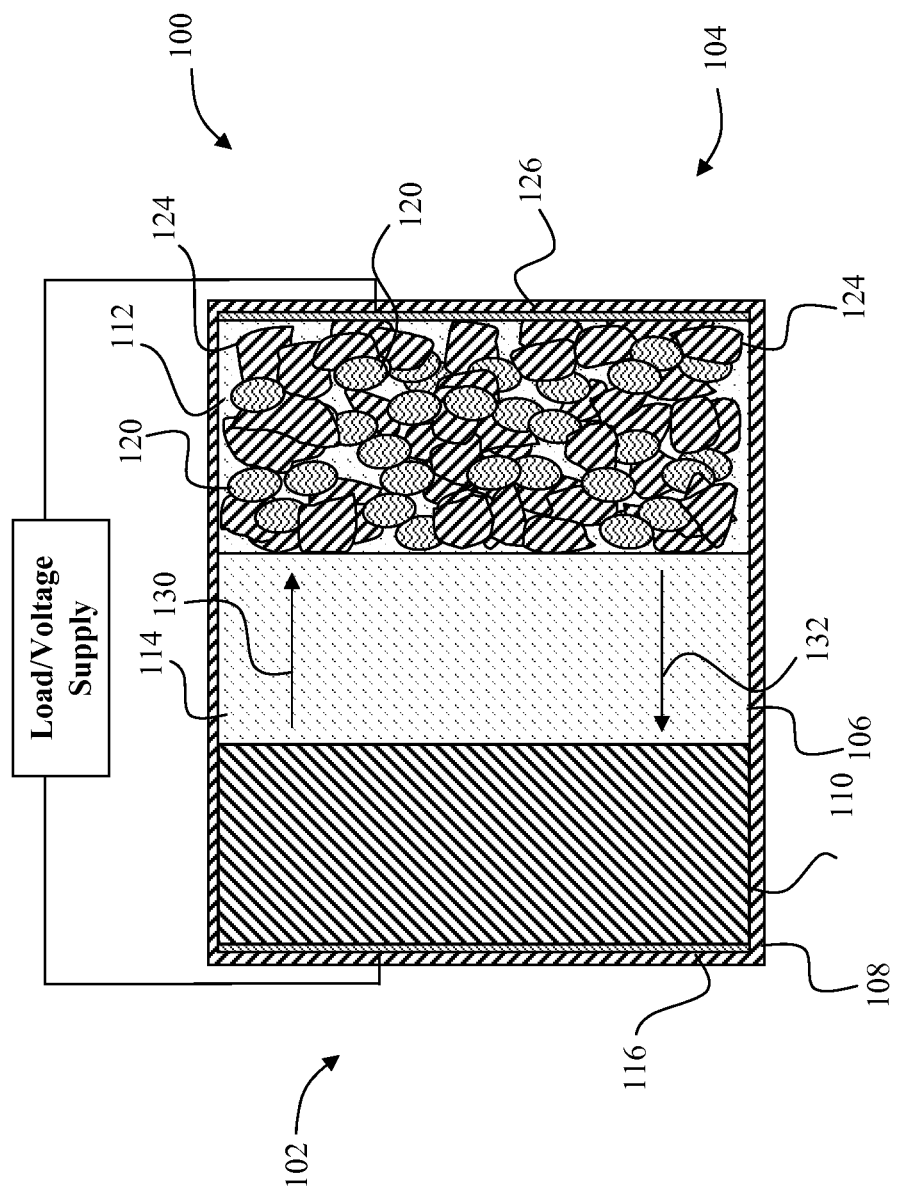

LI-ION BATTERY WITH LOAD LEVELER

This is a continuation-in-part application of application Ser. No. 12/437,745, filed May 8, 2009, the entirety of which is incorporated herein by reference.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

While generally safe, the amount of energy stored within a battery as well as the materials used to manufacture the battery can present safety issues under different scenarios. Safety is particularly an issue when a battery is subjected to increased temperatures either as a result of internal processes or as a result of the environment in which the battery is located.

By way of example, when batteries are charged or discharged, they typically generate heat due to a finite internal resistance that includes ohmic, mass-transfer, and kinetic terms. Exothermic side reactions can also generate heat within the battery. This heat generation can pose a safety risk if it is large and rapid. For instance, commercial Li-ion cells generally go into thermal runaway if the internal cell temperature climbs above the decomposition temperature of the cathode (~180 to 220° C., depending upon the chemistry and the state of charge). Often the events that lead to a temperature rise above this critical temperature are triggered at much lower temperatures. For example, exothermic anode film decomposition can occur at ~120° C., providing enough energy to raise the battery temperature above 180° C. Excessive temperature in a battery may leading to venting of gases, smoke, flames, and, in rare cases, explosion.

Undesired amounts of heat may also be generated in a battery due to undesired physical changes in the battery. By way of example, formation of an electronically conducting phase between the two electrodes (i.e., internal shorting) of the battery can lead to excessive internal discharge. Internal shorting may be caused by dendrite formation, separator melting, separator cracking, separator tearing, pinholes, or growth of some conductive material through the separator. Thus, in addition to safety concerns, dendrite formation can significantly shorten the lifespan of an electrochemical cell.

Furthermore, without good control of the uniformity of dissolution and deposition of the electrode material, morphology changes unrelated to dendrite formation may occur during cycling of the cell. These morphology changes can lead to changes in electrode surface area and subsequent reaction with the electrolyte and/or deleterious volume changes in the cell, either of which can result in capacity fade and impedance rise in the cell.

What is needed therefore is a battery that is less susceptible to dendrite formation and other undesired morphology changes.

SUMMARY

In accordance with one embodiment, an electrochemical cell includes a negative electrode including a form of lithium, a positive electrode spaced apart from the negative electrode, a separator positioned between the negative electrode and the positive electrode, and an electrolyte including a load leveling agent in contact with the negative electrode.

In accordance with another embodiment, an electrochemical cell includes a negative electrode including a form of lithium, a positive electrode spaced apart from the negative electrode, a separator positioned between the negative electrode and the positive electrode; and an electrolyte including a load leveling agent in contact with the negative electrode and with the positive electrode.

BRIEF DESCRIPTION OF THE DRAWINGS

FIG. 1 depicts a schematic of an electrochemical cell with one electrode including a form of lithium and another electrode including an active material with a form of lithium.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion cell 100, which includes a negative electrode 102, a positive electrode 104, and a separator region 106 between the negative electrode 102 and the positive electrode 104. The negative electrode 102, positive electrode 104, and separator region 106 are contained within a pouch 108. The negative electrode 102 includes an active material plate 110 which includes active material into which lithium can be inserted along with inert materials, and a current collector 116.

The negative electrode 102 may be provided in various alternative forms. The negative electrode 102 may incorporate dense Li metal or a Li metal alloy. Incorporation of Li metal is desired since the Li metal affords a higher specific energy than graphite.

The separator region 106 includes an electrolyte 114 with a lithium cation and serves as a physical and electrical barrier between the negative electrode 102 and the positive electrode 104 so that the electrodes are not electronically connected within the cell 100 while allowing transfer of lithium ions between the negative electrode 102 and the positive electrode 104.

The positive electrode 104 includes active material 120 into which lithium can be inserted, inert materials 124, the electrolyte 114 and a current collector 126. The active material 120 may include a form of sulfur and may be entirely sulfur. The active material 120 may incorporate a form of lithium such as lithium oxide or $Li_{4+x}Ti_5O_{12}$.

The lithium-ion cell 100 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 102 during discharging and an equal amount of electrons are consumed at the positive electrode 104 as lithium and electrons move in the direction of the arrow 130 of FIG. 1.

In the ideal discharging of the cell 100, the electrons are generated at the negative electrode 102 because there is extraction via oxidation of lithium ions from the active material 110 of the negative electrode 102, and the electrons are consumed at the positive electrode 104 because there is reduction of lithium ions into the active material 120 of the positive electrode 104. During discharging, the reactions are reversed, with lithium and electrons moving in the direction of the arrow 132.

The electrolyte 114 of FIG. 1, however, further includes a load leveling additive. A load leveling material, such as the load leveling materials identified in U.S. Patent Publication No. 2004/0242804, published on Dec. 2, 2004, the entire contents of which are incorporated herein by reference, is preferably a high molecular weight material and/or provided in a low concentration, thus resulting in bulk diffusion controlled adsorption onto the surface of the depositing anode. The inclusion of a load leveling material in the electrolyte 114 reduces the potential for formation of dendrites.

As discussed in Roha, D. and U. Landau, *Mass Transport of Leveling Agents in Plating: Steady-State Model for Blocking Additives*. Journal of The Electrochemical Society, 1990. 137: p. 824, the exact mechanism by which load levelers encourage uniform deposition of ions is not fully understood. Nonetheless, the load leveling material encourages uniform uptake of lithium by the negative electrode 102 even if the negative electrode 102 includes surface defects. Thus, uneven deposition, which encourages dendrite production, is reduced. Optimal concentrations of load leveling agents for particular battery chemistries may be determined using the model provided by Roha et al.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. An electrochemical cell, comprising:
   a negative electrode including a form of lithium;
   a positive electrode spaced apart from the negative electrode;
   a separator positioned between the negative electrode and the positive electrode; and
   an electrolyte including a load leveling agent exhibiting bulk diffusion controlled adsorption onto the negative electrode during each charge of the cell, the amount of the load leveling agent in the electrolyte selected to be between 1.5 to about 20 wt % of the electrolyte.

2. The electrochemical cell of claim 1, wherein the positive electrode includes a form of sulfur.

3. The electrochemical cell of claim 2, wherein the negative electrode includes $Li_4+xTi_5O_{12}$.

4. The electrochemical cell of claim 1, wherein the load leveling agent comprises a high molecular weight material.

5. The electrochemical cell of claim 4, wherein the load leveling agent comprises a low concentration within the electrolyte.

6. The electrochemical cell of claim 4, wherein the load leveling agent comprises at least one of a high molecular weight and a low concentration.

7. The electrochemical cell of claim 1, wherein the load leveling agent comprises polysiloxane.

8. An electrochemical cell, comprising:
   a negative electrode including a form of lithium;
   a positive electrode spaced apart from the negative electrode;
   a separator positioned between the negative electrode and the positive electrode; and
   an electrolyte including a load leveling agent exhibiting bulk diffusion controlled adsorption onto the negative electrode during each charge and in contact with the negative electrode and with the positive electrode, the amount of the load leveling agent in the electrolyte selected to be between 1.5 to about 20 wt % of the electrolyte.

9. The electrochemical cell of claim 8, wherein the positive electrode includes a form of sulfur.

10. The electrochemical cell of claim 9, wherein the negative electrode includes $Li_4+xTi_5O_{12}$.

11. The electrochemical cell of claim 10, wherein the load leveling agent comprises a high molecular weight material.

12. The electrochemical cell of claim 11, wherein the load leveling agent comprises a low concentration within the electrolyte.

13. The electrochemical cell of claim 8, wherein the load leveling agent comprises at least one of a high molecular weight and a low concentration.

14. The electrochemical cell of claim 8, wherein the load leveling agent comprises polysiloxane.

15. An electrochemical cell, comprising:
   a negative electrode including a form of lithium;
   a positive electrode spaced apart from the negative electrode;
   a separator positioned between the negative electrode and the positive electrode; and an electrolyte including a load leveling agent, wherein the cell is configured such that the electrolyte is in contact with the negative electrode at a location at which plating of lithium occurs during each charge of the cell such that the load leveling agent exhibits bulk diffusion controlled adsorption onto the negative electrode during each charge of the cell.

16. The electrochemical cell of claim 15, wherein the positive electrode includes a form of sulfur.

17. The electrochemical cell of claim 15, wherein the negative electrode includes $Li_4+xTi_5O_{12}$.

18. The electrochemical cell of claim 15, wherein the load leveling agent comprises polysiloxane.

19. The electrochemical cell of claim 15, wherein the load leveling agent comprises a high molecular weight material.

20. The electrochemical cell of claim 15, wherein the load leveling agent comprises a low concentration within the electrolyte.

* * * * *